United States Patent [19]

Donohoe

[11] Patent Number: 5,737,123
[45] Date of Patent: Apr. 7, 1998

[54] ADJUSTABLE-ASPECT VIDEO PROJECTION SCREEN

[76] Inventor: Vincent Donohoe, 4 Coolshanagh Road, Monaghan, Ireland

[21] Appl. No.: 715,153

[22] Filed: Sep. 17, 1996

[51] Int. Cl.$^6$ ........................................... H04N 5/64
[52] U.S. Cl. .................. 359/450; 359/443; 359/460; 348/836; 348/841
[58] Field of Search ...................... 359/443, 450, 359/460, 461; 348/836, 841, 842, 843

[56] References Cited

U.S. PATENT DOCUMENTS

| | | | |
|---|---|---|---|
| 4,951,149 | 8/1990 | Faroudja | 358/230 |
| 5,166,802 | 11/1992 | Thiele et al. | 358/254 |
| 5,343,257 | 8/1994 | Kohno et al. | 348/842 |
| 5,523,880 | 6/1996 | Pidgeon et al. | 359/450 |
| 5,526,066 | 6/1996 | Kikuchi | 348/841 |

*Primary Examiner*—Daniel P. Malley
*Attorney, Agent, or Firm*—J. E. McTaggart

[57] ABSTRACT

An adjustable-aspect ratio video projection viewing screen assembly has a screen portion that is basically proportioned as a widescreen, e.g. with 16:9 aspect ratio, but is convertible to a second aspect ratio, e.g. regular 4:3 aspect ratio, by means of a pair of telescopic side panel assemblies, each having a fixed portion extending outwardly beyond the side edge of the widescreen, and a movable portion that can be located in front of the fixed portion for widescreen viewing or moved inwardly to cover the void side margins for viewing at regular aspect ratio. The fixed portions also serve as stereo speaker baffle boards, the movable panels being made acoustically transparent. The movable panels may be adjusted manually or can be fitted with an electrical power mechanism controlled manually or controlled automatically from an aspect mode control signal originating from the video projection system. All four panels are typically covered with matching grille cloth. The unit may be wall-mounted or may stand alone, supported by a pedestal, tripod or overhead suspension.

8 Claims, 2 Drawing Sheets

ADJUSTABLE-ASPECT VIDEO PROJECTION SCREEN

FIELD OF THE INVENTION

The present invention relates to projection viewing screens and more particularly it relates to a video projection viewing screen that is adjustable with regard to aspect ratio so as to optimally display picture information from video sources formatted in different aspect ratios.

BACKGROUND OF THE INVENTION

There are increasing requirements for video projection screens to operate sometimes in the regular aspect ratio of 4:3 which is the North American NTSC standard for television broadcasting, and at other times in a widescreen aspect ratio, for example 16:9, which has become popular world-wide for displaying movies originally produced in "widescreen" format.

FIG. 1A depicts a rectangular video screen 10, of regular 4:3 aspect ratio, displaying a video image 12A of a regular 4:3 aspect ratio linearity test pattern.

FIG. 2A depicts a rectangular video screen 14, of widescreen 16:9 aspect ratio, displaying a video image 16A of a widescreen 16:9 linearity test pattern.

In both cases, FIGS. 1A and 2A, correct geometry, i.e. linearity and aspect ratio, is indicated by accurate reproduction of the circles in the test pattern, which should appear perfectly round without any compression or stretching in either the x or y axis. In both instances, FIG. 1A and FIG. 2A, the image just fills the corresponding screen and is correctly displayed since each screen inherently matches the source video format with regard to aspect ratio.

Typically the available viewing screen is fixed at one aspect ratio, and thus when it is attempted to display material that was originated in a different aspect ratio, difficulties arise that can be overcome only by some degree of compromise.

FIGS. 1B-1D depict the results of conventional approaches to the problem of attempting to display a widescreen image on a regular screen.

In FIG. 1B the full widescreen test pattern image 16A is fitted onto regular screen 10 without any loss of picture information at each side: this results in void regions 10A and 10B at the top and bottom of the screen 10, and a noticeable reduction of image size, compared to FIG. 2A.

In FIG. 1C the image size has been increased somewhat so that the void regions are smaller, however loss of picture information is indicated by the portions of the small circles that are clipped off.

In FIG. 1D the size has been further increased to utilize the full area of screen 10; however the increased loss of picture information is indicated by about half of the small circles being clipped off.

FIG. 1E illustrates the result if the image of FIG. 1D is compressed horizontally to retain all of the picture information: the resulting image 16A' exhibits severe aspect distortion as indicated by the elliptical shape of the test pattern circles. This amount of aspect distortion, which makes human figures appear extremely thin, is unacceptable.

Similarly FIGS. 2B-2D depict the results of attempting to display a regular aspect image 12A on a widescreen 14: in FIG. 2B the side margin regions 14A and 14B are void, in FIG. 2C, with side margin regions 14A and 14B reduced, picture information is lost at the top and bottom, and in FIG. 2D, filling the screen 14 horizontally causes further loss of picture information at top and bottom.

FIG. 2E illustrates the result if the image 12A of FIG. 2D is compressed vertically to retain all of the picture information: in this case the nature of the aspect distortion in image 12B' is opposite to that shown in FIG. 1E but it is equally unacceptable.

U.S. Pat. No. 5,521,658 for OPTICAL ASPECT RATIO CONTROL FOR VIDEO PROJECTION by the present inventor, Vincent Donohoe, discloses a video projection system that operates at different aspect ratios, including 4:3 (regular) and 16:9 (widescreen), while always utilizing the full capability and area of a projector imaging panel in a beneficial and efficient manner. Selection of the operating aspect mode for the projection system can be manual or automatic, and the adjustment can be provided in two or more discrete steps or made continuously variable, i.e. proportional. In any case, a corresponding aspect mode selection signal is readily available to control the variable aspect projection screen of the present invention in two or more discrete steps or proportionally.

In general, large video screens tend to be obtrusive in a residential setting, and in some instances are used infrequently, therefore the size and shape of the screen represent a compromise between the desire for large screen viewing and the desire to keep the screen as small and unobtrusive as possible especially when it is not in use.

OBJECTS OF THE INVENTION

It is a primary object of the present invention to provide a video projection viewing screen system that can perform efficiently in two or more modes with regard to video source aspect ratio, e.g. 4:3 regular and 16:9 widescreen.

It is further object for the viewing screen to have the capability of operating in at least two different modes with regard to aspect ratio without loss of picture information, without geometric distortion and without exposing void screen area.

SUMMARY OF THE INVENTION

The above objects and advantages have been realized in the present invention wherein a video projection viewing screen is basically formed as an elongated rectangle dimensioned to provide a widescreen, e.g. having a 16:9 aspect ratio, but provided with a pair of telescopic side panel assemblies, one at each opposite side edge. Each side panel assembly includes a fixed portion, extending outwardly from the side edge of the widescreen. This fixed portion also functions as a speaker baffle board. Each side panel assembly also includes a second panel of similar size that is made to be movable between two working locations. In its first working location for widescreen viewing, the movable panel is located directly in front of the fixed portion, and is provided with corresponding acoustical openings located so as not to degrade the sound from the speaker(s). In this locations, both panels of the assembly extend outwardly from the corresponding widescreen side edge. In the other working location for regular aspect ratio viewing, the movable panel extends inwardly from the widescreen edge so to conceal the edge margin of the widescreen that becomes void when viewing picture information of regular 4:3 aspect ratio. The pair of movable panels may be actuated manually or by a power mechanism which may be controlled manually or automatically from an aspect mode control signal originating from the video projection system. All four panels are typically covered with matching grille cloth.

BRIEF DESCRIPTION OF THE DRAWINGS

The above and further objects, features and advantages of the present invention will be more fully understood from the following description taken with the accompanying drawings in which.

DETAILED DESCRIPTION

FIGS. 1A–1E and 2A–2E have been described above in connection with the background of the invention.

Figure 1A:
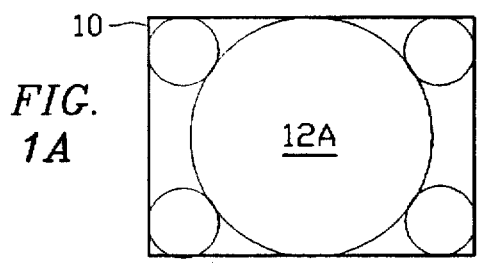
FIGS. 1A and 2A depict correct display of test patterns of regular 4:3 aspect ratio and widescreen 16:9 aspect ratio respectively.
Figure 3A:
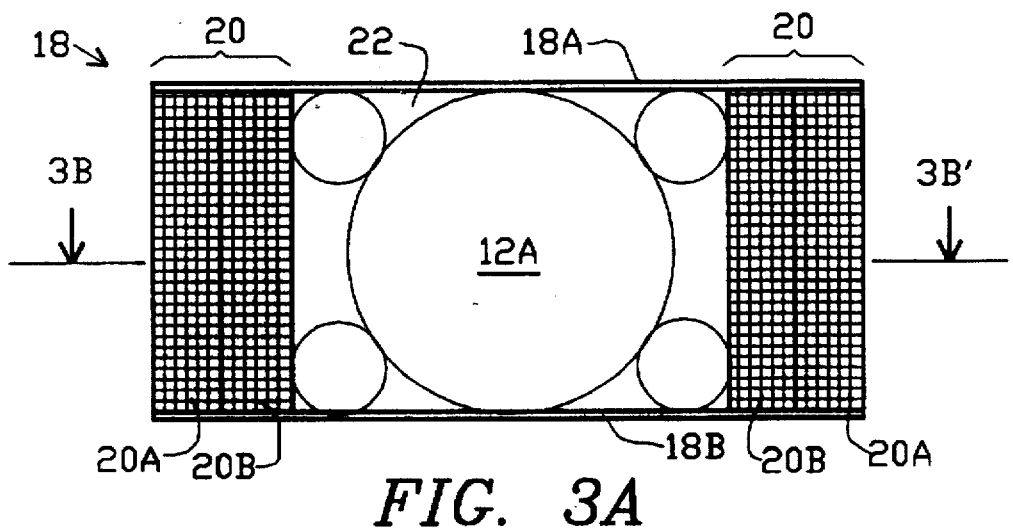
FIG. 3A is an elevational view of a dual aspect ratio video projection screen assembly of the present invention set to operate in a normal aspect ratio viewing mode.

FIG. 3A is an elevational view of a variable aspect ratio video projection screen assembly 18 of the present invention, adjusted to operate in a first mode for viewing picture information that is formatted in regular 4:3 aspect ratio, as indicated by test pattern 12A which appears correctly as in FIG. 1A without displaying any void screen area. A pair of symmetrical side panel regions 20 flanking the viewing screen 22 each containing a fixed panel 20A and a movable panel 20B are typically surfaced with conventional acoustic grille cloth. Front edges of top and bottom panels 18A and 18B are shown: as a matter of design and appearance preference, these may be revealed from the front as shown, or alternatively they could be concealed behind side panel regions 20 and screen 22.

Viewing screen 22, which provides the required fixed flat reflective surface, can be implemented from known technology; it can be stretched or panel-supported, and may be made in a lenticular or other known and available implementation selected for suitability with the associated projection system.

Figure 3B:
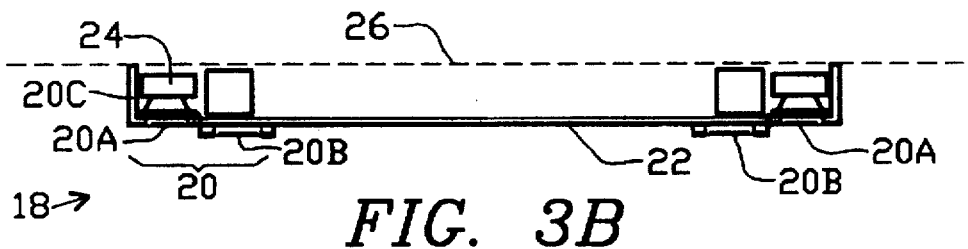
FIG. 3B is a cross-section taken through axis 3B–3B' of FIG. 3B.

FIG. 3B is a cross-section taken through axis 3B–3B' of FIG. 3B, showing side panel region 20 of screen assembly 18 to be made up of a substantially rectangular vertical elongated fixed side panel 20A utilized along with end panel 20C as a speaker baffle carrying a speaker 24, and a movable side panel 20B extending toward center screen from the edge of fixed side panel 20A, such that while movable side panels 20B are located in a plane parallel to the screen 22 and immediately forward of the plane of fixed side panels 20A, from the front the two panels at each side appear as a continuous side panel region 20, as seen in FIG. 3A. Movable panels 20B serve to conceal the edge margins of screen 22 that are void when viewing picture material of regular aspect ratio as shown. Speaker 24 and its counterpart at the opposite edge region form a stereophonic dual speaker system according to common stereophonic practice, may optionally utilize multiple speakers, e.g. 2- or 3-way speaker units with crossovers, for each stereo channel. The left and right hand screen regions are made to be mirror images of each other.

Figure 2A:
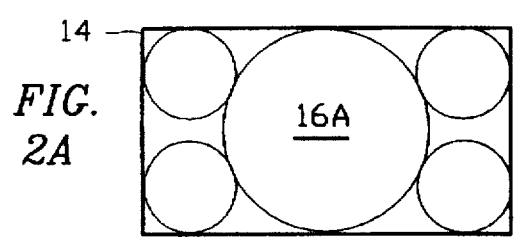
Figure 1B:
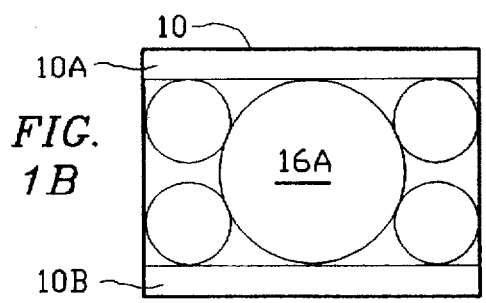
FIGS. 1B–1E illustrate the problems in conventional practice in attempting to utilize a viewing screen of regular aspect ratio for viewing widescreen picture material.
Figure 2B:
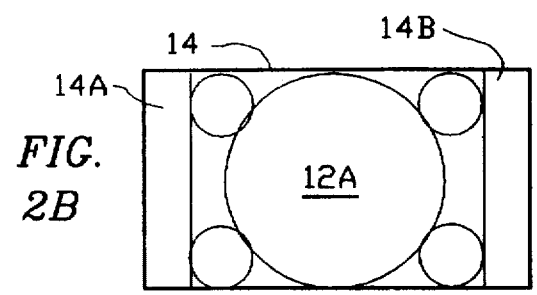
FIGS. 2B–2E illustrate the problems in conventional practice in attempting to utilize a widescreen for viewing video material of regular aspect ratio.
Figure 1C:
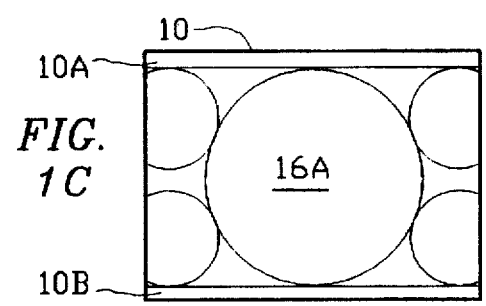
Figure 2C:
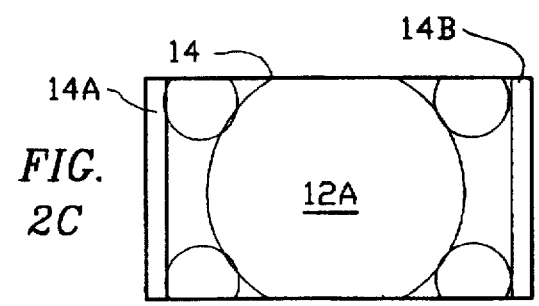
Figure 1D:
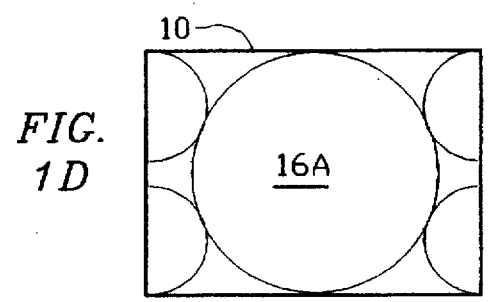
Figure 2D:
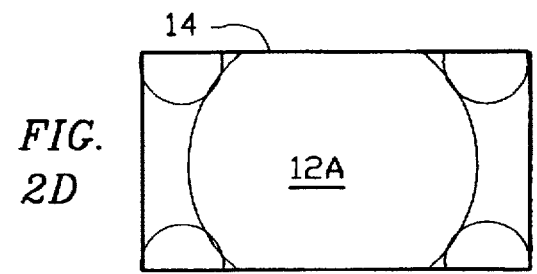
Figure 1E:
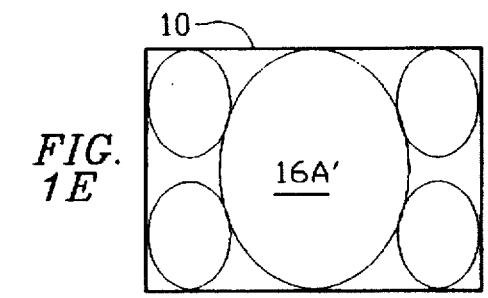
Figure 2E:
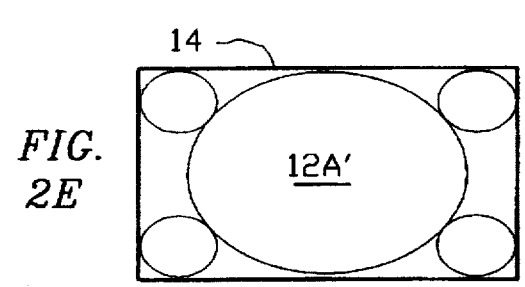
Figure 4A:
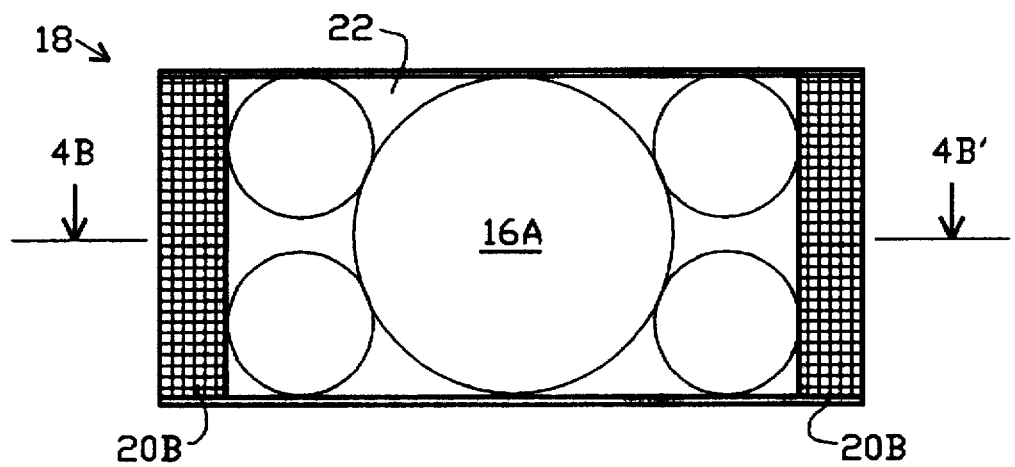
FIG. 4A shows the subject matter of FIG. 3 set to operate in a widescreen aspect ratio viewing mode.

FIG. 4A shows the screen assembly 18 of FIG. 3A–B adjusted to operate in a widescreen aspect ratio viewing mode for viewing picture information that is formatted in widescreen 16:9 aspect ratio, as indicated by widescreen test pattern 16A which is shown displayed correctly, as in FIG. 2A. In this mode, movable side panels 20B are seen to each extend outwardly beyond the side edges of screen 22, where they conceal the fixed side panels.

Figure 4B:
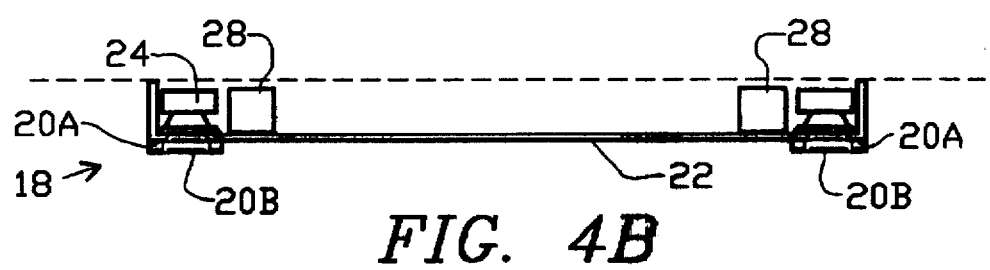
FIG. 4B is a cross-section through axis 4B–4B' of FIG. 4A.

FIG. 4B is a cross-section through axis 4B–4B' of screen assembly 18 as in FIG. 4A but adjusted to operate in the widescreen mode. The movable panels 20B have been shifted apart so as to be positioned directly in front of fixed panels 20A, exposing the full width of widescreen 22. The movable panels 20B are constructed and arranged to fit closely in front of the fixed panels 20A without degrading the acoustic output from speakers 24: panels 20B may be made as frames supporting the grille cloth covering, or as solid panels with regions cut out in the vicinity of the speakers 24.

This telescopic function of panels 20A and 20B is readily implemented by means of top and bottom retention tracks well known in the cabinetry arts: the tracks may be in the form of added hardware or routed into the material of top and bottom panels 18A and 18B (FIG. 3A). Alternatively, the telescopic function could be realized through the use of a tambour door style of known art that is made flexible and segmented so as to be retractable by rolling around a curved end portion and winding into a roll or moving into a concealed side/rear location within the required travel range.

An electrical mechanism may be provided as actuating means for positioning movable panels 20B simultaneously and symmetrically within the travel range. Electrical mechanisms are commercially available linear or rotary motor(s) and/or geared system that can be controlled from video circuitry associated with the projector and designed to automatically position the panels in accordance with the particular aspect ratio in use at any time so as to expose only the required viewing width. By design choice, the unit can be made to have two discrete modes of operation (e.g. regular and widescreen), more than two discrete modes or it can be made continuously variable such that in addition to two basic operating modes of aspect ratio at the ends of the range as described above, the invention may be made to operate in a continuously variable mode in a predetermined panel travel range such that the panels can be automatically positioned anywhere within the range. Typically the panels are made to be actuated simultaneously: they may utilize separate motive means for each panel located as indicated in FIG. 4B at boxes 28, at the top and/or bottom region of screen 22, or a common motive means mechanically linked to each panel. Such means, known in the cabinetry, drapery and automotive arts, are typically electrically energized.

The screen assembly 18 can be configured with an open back as shown for wall mounting, or the back could be enclosed for a free-standing screen configuration to be supported by a tripod, pedestal, overhead suspension or other support means.

The utilization of side panel regions 20 for speaker enclosures is an optional bonus feature of the invention: alternatively, for wall mounting, the screen assembly 18 can be made in a thin package, with or without speakers, and the panels may be finished to blend with surrounding wall color/texture thus minimizing the decorative influence of the screen unit.

A key feature of the invention is the dimensional relation between the width of the regular screen and that of the widescreen, which in turn determines the side panel width. Assuming a common height, comparing 4:3 versus 16:9 aspect ratios, the widescreen is ⅓ wider (16/12): the widescreen version of a 6 foot regular screen display becomes 8 feet wide, resulting in one foot margins on each side to be covered by the width of movable panels 20B, and since the fixed panels 20A are made the same width, the screen assembly 18 would be 10 feet wide. The one foot wide fixed panels 20A would readily accommodate a 10" diameter round speaker. In a scaled-down smaller version, elliptically-shaped speaker units could be utilized in vertical orientation. Low profile speakers are available to minimize the front-to-back thickness requirement of the screen assembly 18, which is typically made in the order of a few inches.

The foregoing embodiment, utilizing a pair of movable side panels and a pair of similar fixed side panels, is presented as an aesthetically preferred embodiment, however the invention could be practiced without the fixed panels, allowing the movable panels to shift out onto an adjacent wall region for widescreen viewing.

The principle of the invention could also be applied in a complementary manner utilizing movable top and bottom panels (and optionally top and bottom fixed panels) instead of right and left movable side panels as described above: the full width of the screen width would always be utilized. The full screen could be proportioned for standard aspect (4:3), so that for widescreen viewing, the movable top and bottom panels would be shifted to cover void top and bottom portions of the screen. Undesirably, the widescreen image would tend to appear small in comparison to an image of regular aspect.

The invention could also be practiced with only a single movable panel. For a basic wide screen, the single movable panel could be located at the right or left hand side, or for a basic regular aspect screen the single movable panel could be located at the top or bottom. The inherent asymmetry of the single panel approach may be found objectionable aesthetically; functionally it has the disadvantage of requiring the projector to shift the image laterally whenever the aspect ratio is changed, in order to maintain proper registration of the image on the screen.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. An adjustable-aspect screen assembly for viewing a projected picture image originating from an associated projection means, comprising:

a substantially rectangular projection screen constructed and arranged to display a visual image in a substantially vertical plane, said screen extending between a pair of opposed vertical side edges defining a horizontally-elongated rectangular shape of said screen having a predetermined width and height defining a first aspect ratio, and a matching pair of substantially rectangular movable side panels, disposed symmetrically at the opposed vertical side edges of said screen in a vertical plane adjacent to and parallel with said screen, each panel being dimensioned to have a predetermined width and to have a height approximating that of said screen, said movable side panels being constructed and arranged to be movable horizontally in a range between a first display mode wherein each panel extends outwardly from a respective one of the side edges of said screen, thus exposing said screen in full width and thus at the first aspect ratio corresponding to a wide screen display format, and a second display mode wherein said movable side panels, having been shifted toward each other, each extend inwardly from the corresponding side edge of said screen so as to conceal a predetermined vertically elongated side margin region and thus define a second aspect ratio corresponding to a relatively narrower screen display format.

2. The adjustable-aspect screen assembly as defined in claim 1 further comprising:

a pair of matching substantially rectangular vertical elongated fixed side panels, constructed and arranged to flank said screen, extending outwardly from each side edge thereof, and to cooperate correspondingly with said movable side panels in a telescopic manner so as to appear and function as a pair of symmetrical variable-width side panels.

3. The adjustable-aspect screen assembly as defined in claim 2 wherein said movable side panels and said fixed side panels are all made substantially equal to each other in size and shape, said fixed panels being disposed in a first plane with said screen and said movable side panels being disposed in a second plane immediately forward of the first plane, such that in the first display mode, each of said movable side panels is caused to substantially conceal a corresponding one of said fixed side panels.

4. The adjustable-aspect screen assembly as defined in claim 1, for viewing projected video images, wherein the first aspect ratio is made to be nominally 16:9 in accordance with a widescreen display format, and the second aspect ratio made to be nominally 4:3 in accordance with a regular display format.

5. The adjustable-aspect screen assembly as defined in claim 2, further comprising a pair of stereo speaker units, mounted in an acoustically functional manner one on each of said fixed side panels, said movable side panels being constructed and arranged to be effectively transparent acoustically when positioned correspondingly in front of said fixed side panels.

6. The adjustable-aspect screen assembly as defined in claim 2, further comprising actuating means constructed and arranged to move said movable side panels in opposite horizontal directions between the first and second locations in response to a designated control signal.

7. The adjustable-aspect screen assembly as defined in claim 6 wherein said control signal is made responsive to aspect ratio format of projected video picture information, so as to enable automatic aspect mode selection by positioning of said movable side panels in said screen assembly.

8. The adjustable-aspect screen assembly as defined in claim 2 wherein said fixed side panels and said movable side panels are covered with matching grill cloth material.

\* \* \* \* \*

UNITED STATES PATENT AND TRADEMARK OFFICE
CERTIFICATE OF CORRECTION

PATENT NO. : 5,737,123
DATED : Apr. 7, 1998
INVENTOR(S) : Vincent Donohoe

It is certified that error appears in the above-identified patent and that said Letters Patent is hereby corrected as shown below:

Column 2, line 8-21, delete " U.S. Pat. No. 5,521,658 for OPTICAL ASPECT RATIO CONTROL FOR VIDEO PROJECTION by the present inventor, Vincent Donohoe, discloses a video projection system that operates at different aspect ratios, including 4:3 (regular) and 16:9 (widescreen), while always utilizing the full capability and area of a projector imaging panel in a beneficial and efficient manner. Selection of the operating aspect mode for the projection system can be manual or automatic, and the adjustment can be provided in two or more discrete steps or made continuously variable, i.e. proportional. In any case, a corresponding aspect mode selection signal is readily available to control the variable aspect projection screen of the present invention in two or more discrete steps or proportionally." should read –There are available video projection systems that can be operated at different aspect ratios, including 4:3 (regular) and 16:9 (widescreen).

Selection of the operating aspect mode for the projection system can be manual or automatic, and the adjustment can be provided in two or more discrete steps or made continuously variable, i.e. proportional. In any case, a corresponding aspect mode selection signal is readily available to control the variable aspect projection screen of the present invention in two or more discrete steps or proportionally.

Signed and Sealed this

Eighteenth Day of August, 1998

*Attest:*

BRUCE LEHMAN

*Attesting Officer*  *Commissioner of Patents and Trademarks*